Oct. 13, 1936. W. T. RUNCIE 2,057,208
APPARATUS FOR SALTING WATER
Filed May 27, 1933 2 Sheets-Sheet 1
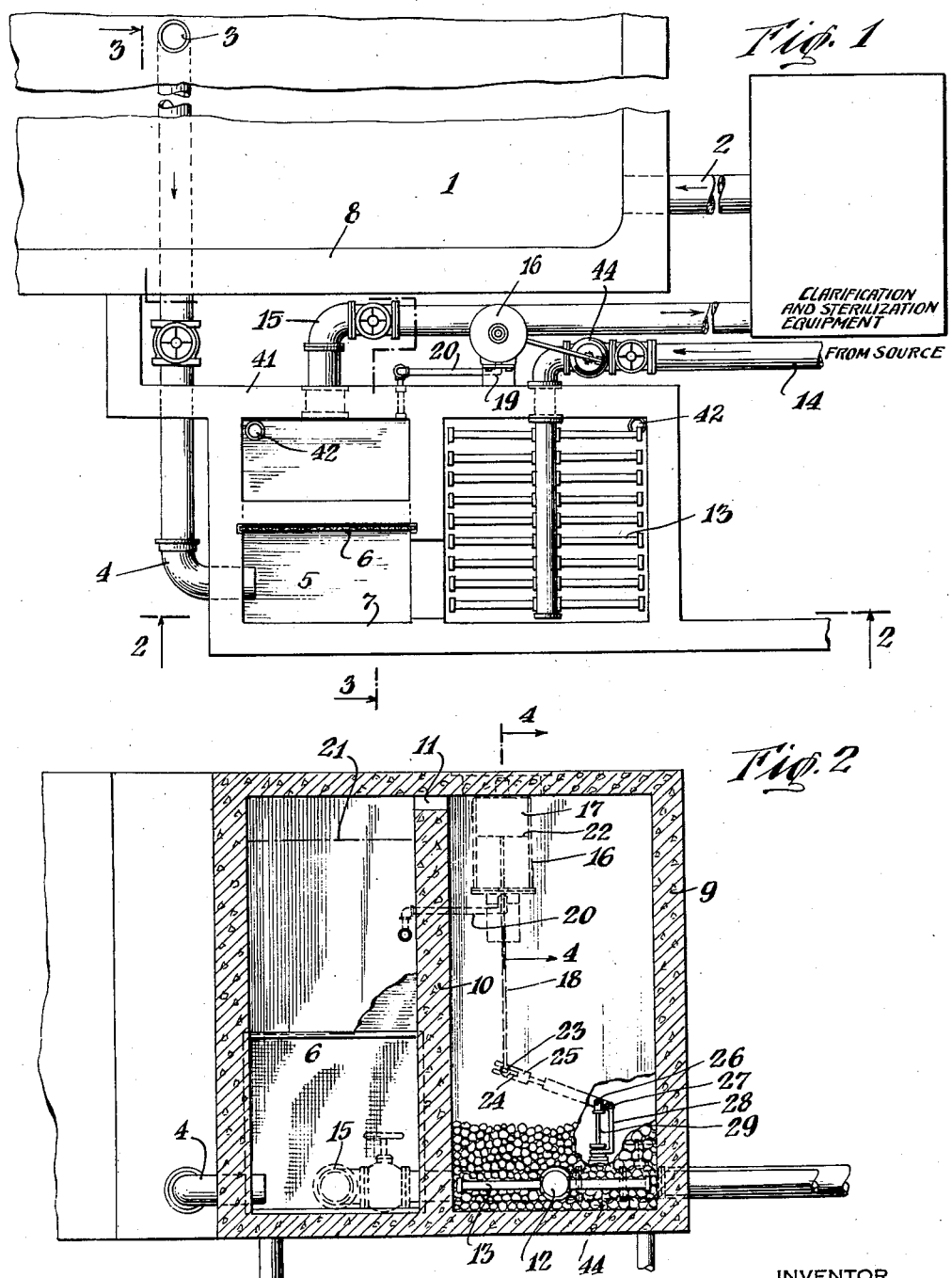

Oct. 13, 1936.    W. T. RUNCIE    2,057,208
APPARATUS FOR SALTING WATER
Filed May 27, 1933    2 Sheets-Sheet 2

INVENTOR
William T. Runcie
BY Hoguet Meary
ATTORNEYS

Patented Oct. 13, 1936

2,057,208

UNITED STATES PATENT OFFICE 2,057,208

APPARATUS FOR SALTING WATER

William T. Runcie, Maplewood, N. J.

Application May 27, 1933, Serial No. 673,297

8 Claims. (Cl. 210—11)

This invention relates in general to improvements in a method and apparatus for the treatment of water to be used in swimming pools and in particular to that which will provide for a salt content as well as for an efficient circulation and purification.

An object of the invention is to provide a system of water circulation and purification so as to render the water suitable for bathing purposes which water will have a salt content.

A further object is to provide such system wherein the fresh water will be automatically added and salted and circulated so that the salt content of the water in the pool may be maintained and so that the pool water level will remain substantially constant.

I am aware that it is conventional practice in the swimming pool art to circulate the water and subject it in most cases to clarification and sterilization treatment as well as to introduce salt, or other materials to soften it. However, in such systems, as the water is added from time to time the newly added water is either not salted, or a separate reservoir of salt water is prepared and introduced into the system as a distinct and separate function, so that when the water in the pool rises to or falls below a prescribed level, the replenishing of the salt water in the pool involves a manual control by an attendant.

With this in view therefore and in following out the objects of my invention I propose to provide a salt bath for the water as it comes from its source, after which I may subject it to clarification, if necessary, and sterilization on its way to the pool. I provide the pool with suitable inlets and drains. I may also provide waste and overflow returns to that portion of the system including the clarification and sterilization equipment, but I preferably by-pass this pool return water so that it is not again subjected to a salt bath. I further propose to arrange a float control valve means whereby the new water subjected to the salt bath will be automatically added and circulated throughout the system to the pool or directly to the pool as soon as the pool water recedes below a predetermined level.

With the foregoing and other objects in view the invention resides in the combination of parts and in the details of construction generally hereinafter set forth in the following specification and appended claims, certain embodiments thereof being illustrated in the accompanying drawings, in which:

Figure 1 is a fragmentary top plan view of the system showing the pool, inlets to the pool, float chamber, regulating valve, salt bath, etc. to the exclusion of the clarification and sterilization equipment;

Figure 2 is a view in section taken along line 2—2 of Figure 1;

Figure 3:
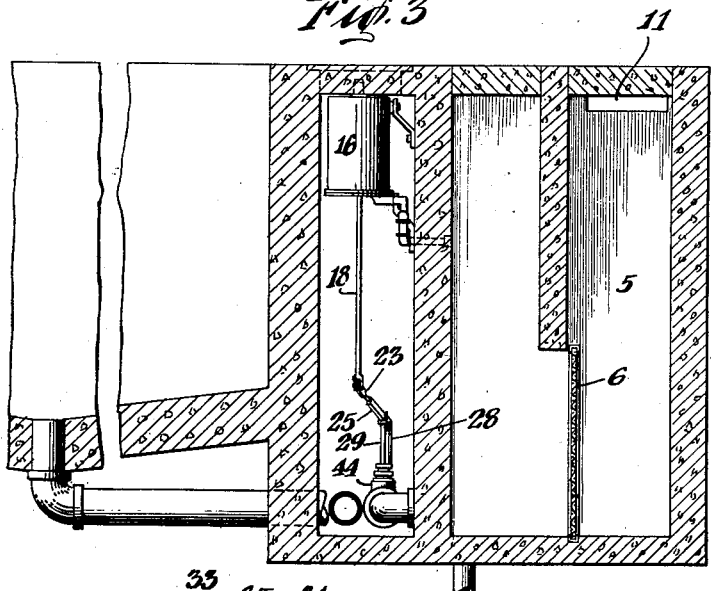
Figure 3 is a view in section taken along line 3—3 of Figure 1.
Figure 4:
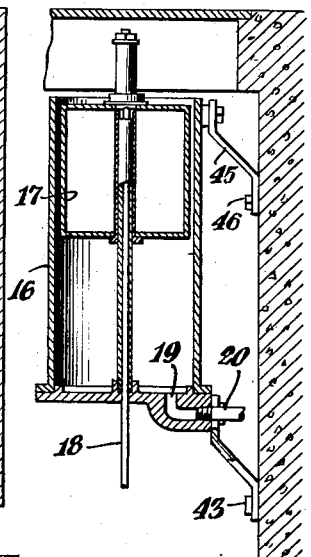
Figure 4 is a view in section taken along line 4—4 of Figure 2.

Referring more particularly to the drawings the pool is shown at 1 and there is indicated at 2 an inlet, of which there may be any suitable number, to the pool for the water after it has or has not been clarified and sterilized or otherwise treated. This pool may be provided with any number of drains or outlet returns one of such drains being illustrated at 3 which consists of a pipe 4 extending into a chamber 5. This chamber 5 is usually provided with a drain such as shown at 42 and also with a screen 6 to catch relatively large foreign particles and the chamber itself is adapted to act as a sump, its walls 7 being of approximately the same height as the walls 8 of the swimming pool, or any other suitable equivalent arrangement.

Adjacent the sump is arranged another chamber forming a salt bath which is provided with walls 9 of the same height as the sump chamber, the intermediate wall 10 between the two chambers being provided with a weir or passage 11 between the two. The salt bath chamber is usually provided with a drain such as shown at 42' and also a manifold including a central pipe 12 and a series of laterally spaced tubes 13 which are suitably perforated in order to cause an equal distribution of the water as it enters the chamber. This manifold may be replaced if found desirable with a perforated plate which extends over the cross section of the chamber above the inlet. Above and below this manifold may or may not be disposed any desirable quantity of gravel upon which the salt may be deposited to effect a thorough mixture of salt and water as the water is introduced through the manifold or a perforated plate, from the inlet pipe 14 from any suitable source.

For purposes of convenience the various clarification and sterilization apparatus which may be of any suitable type for the cleansing and purification and treatment of the water is merely indicated in the drawings and the inlet and outlet pipes thereof shown. Suffice it to say, however, as the pool has been filled the circulation follows the order of the outlet through the drain 3 and thence through the pipe 4 through the sump 5 and a screen such as 6 if provided, from whence it is adapted to flow or be pumped out through an outlet pipe 15 in the direction of the indicating arrow to the clarification and sterilization apparatus or direct to the pool. As will be seen from the above. The incoming water from the water source may be pumped or otherwise led through a separate pipe 14 and first of all is subjected to the salt bath after which it may be pumped or otherwise directed to join the pool return water and pass out through the conveyer 15 together with the pool return water to be subjected to the various devices for purification or be passed directly to the pool without clarification and/or sterilization.

Besides providing for a means for maintaining the salt content of the water in the pool by subjecting the incoming new water to a salt bath and by-passing the salted pool return water around the salt bath, there is also provided a means for automatically introducing new salted water as soon as the pool water recedes below a predetermined level. This is brought about by the provision of a float control valve which may take the form shown in Figures 1 to 4 inclusive and which consists of a float chamber 16 in which there is slidably arranged a float 17 carried by a slidable stem 18. This float chamber is preferably arranged outside of any mixing chamber and may be secured to the wall 41 between the mixing chambers and the pool by suitable brackets 45 secured to the wall 41 at 43 and 46. The float chamber has an inlet 19 in communication with a pipe 20 extending into the sump 5 or into the main pool or reservoir. As long as the water level in the sump 5 is the same as indicated in dotted lines at 21 the float 17 will remain in the position shown in Figure 2 and the water level in the float chamber 16 shown at 22 coincide with that in the sump or in the main pool or reservoir by reason of the communicating pipe 20. However, as the water level in the sump and/or pool or reservoir drops below that indicated in Figure 2, the water level in the float chamber will recede and as the float 17 falls downwardly, due to the force of gravity, the stem 18 will naturally also go downward. This downward movement of the stem 18 due to its sliding connection at 23 in a slot 24 of an arm 25 causes the latter to be depressed and moved about a pivot 26. The arm 25 is also pivoted at 27 to a suitable bracket 28 so as to force a plunger 29 downwardly which results in the opening of a valve 44, the interior of which is not shown, to allow the ingress of water through the pipe 14 from the water source. This causes the fresh water to be introduced through the manifold and subjected to the salt bath and this water continues to be introduced into the salt bath as long as the water level of the sump 5 and the corresponding water level of the pool stays below a predetermined level. It obviously follows that as the water supply in the pool is replenished so that the water level again rises to the predetermined level the float will again be elevated to the position shown in Figure 2 and the incoming water supply be automatically cut off.

Figure 6:
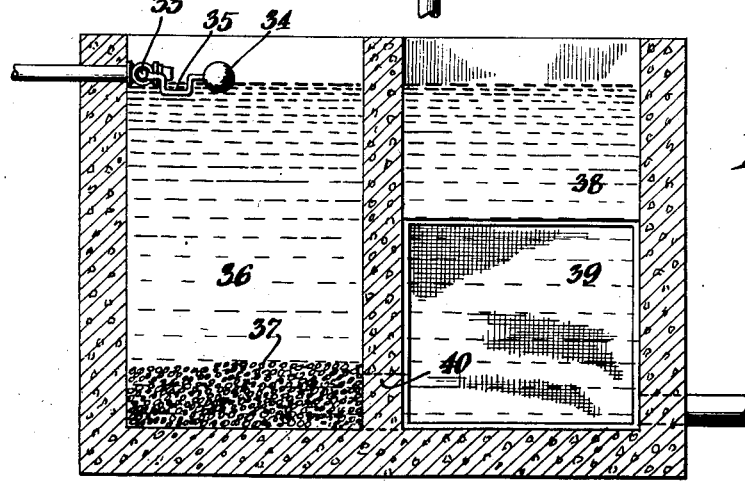
Figure 6 is a view in section taken along line 6—6 of Figure 5.
Figure 5:
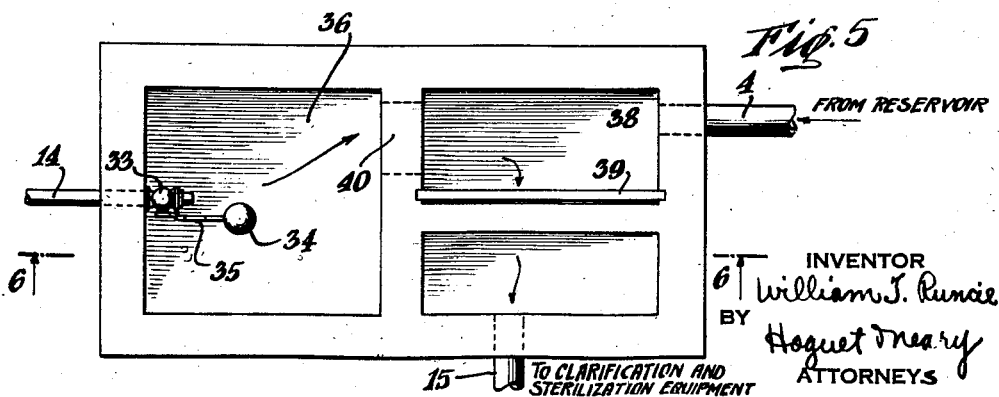
Figure 5 is a plan view of a modified form of the salt bath and regulating valve.

As an alternate form Figures 5 and 6 show an inlet pipe 4 from the pool and an outlet pipe 15 to the clarification and sterilization apparatus for pool or reservoir. In this modification the fresh water may be introduced through the inlet pipe 14 and allowed to stand at a predetermined level and the float regulating valve 33 may be actuated by means of a float 34 and an actuating arm 35 carried thereby so that as the water supply in the salt bath chamber is diminished by circulation or otherwise below a certain predetermined level the valve may be actuated so as to be opened and allow more fresh water to be introduced into the salt bath chamber which is indicated at 36, the salt, gravel and the like being shown in the bottom thereof at 37. The adjacent chamber 38 may be provided with a screen 39 for the collection of relatively large foreign particles, and the two chambers may be provided with a suitable communication passage 40 at the lower part of the chambers 36 and 38.

In connection with the form of my invention shown in Figures 1 to 4 which provides for a circulation of water as described in connection therewith, I may find it desirable to reverse the flow of water to and from the pool. The new salted water may be by-passed around the screen sump 5 and be directly introduced into the pool instead of passing it through the filter. In either of these cases the control water line to float pot would be connected directly into the pool to receive its supply therefrom for float and automatic valve operation.

I claim:

1. In a water circulation system, a main reservoir, a salt chamber, an inlet thereinto for water from a suitable source into said salt chamber, said system including drain from said reservoir, and a valve means for automatically controlling the ingress of water from said source into the salt chamber as the water in said reservoir rises to or falls below a predetermined level, a sump in communication with said reservoir and a screen arranged in said sump, said automatic valve means comprising a valve and a float chamber in communication with the water in said sump returned from said reservoir, the water level in said float chamber being adapted to maintain substantially the same height as that of said sump and reservoir.

2. In a water circulation system, a main reservoir, a salt chamber, an inlet thereinto for water from a suitable source into said salt chamber, an apparatus for treatment and purification of the water from said reservoir and from said salt chamber, and a valve means for automatically controlling the ingress of water from said source into the salt chamber as the water in said reservoir rises to or falls below a predetermined level, a sump, a drain conduit leading into said sump from said reservoir, a screen arranged in said sump, said automatic valve means comprising a valve and a float chamber in communication with the water in said sump returned from said reservoir, the water level in said float chamber being adapted to maintain the same height as that of said sump and reservoir.

3. In a water circulation system, a main reservoir, a salt chamber, an inlet thereinto for water from a suitable source into said salt chamber, and a by-pass for water returning from said reservoir, said by-pass being out of communication with said salt chamber, and a valve means for automatically controlling the ingress of water from said source into the salt chamber as the water in said reservoir rises to or falls below a predetermined level, a sump, a drain conduit leading into said sump from said reservoir, a screen arranged in said sump, said automatic valve means comprising a valve and a float chamber in communication with the water in said sump returned from said reservoir, the water level in said float chamber being adapted to maintain the same height as that of said sump and reservoir.

4. In a water circulation system, a main reservoir, a salt chamber, an inlet thereinto for water from a suitable source into said salt chamber, and a valve means for automatically controlling the ingress of water from said source into the salt chamber as the water in said reservoir rises to or falls below a predetermined level, a sump, a drain conduit leading into said sump from said reservoir, a screen arranged in said sump, said automatic valve means comprising a valve and an exteriorly located float chamber and float therein for operating said valve, said chamber being in communication with the water in said sump returned from said reservoir, the water level in said float chamber being adapted to maintain the same height as that of said sump and reservoir.

5. In a water circulation system, a main reservoir, a sump and a salt chamber, an inlet for fresh water into said salt chamber, an inlet into said sump from said salt chamber, a drain from said reservoir out of communication with said salt chamber, and a passage for water from said sump, and from said drain, into said reservoir.

6. In a water circulation system, a main reservoir, a sump and a salt chamber, an inlet for fresh water into said salt chamber, an inlet into said sump from said salt chamber, a drain from said reservoir out of communication with said salt chamber, a passage for water from said sump, and from said drain, into said reservoir, and valve means for automatically controlling the ingress of fresh water into said salt chamber as the water in said reservoir rises to or falls below a predetermined level.

7. In a water circulation system, a main reservoir, a sump and a salt chamber, an inlet for fresh water into said salt chamber, an outlet from said salt chamber into said sump, a drain from said reservoir into said sump and out of communication with said salt chamber, and a passage for water from said sump into said reservoir.

8. In a water circulation system, a main reservoir, a sump and a salt chamber, an inlet for fresh water into said salt chamber, an outlet from said salt chamber into said sump, a drain from said reservoir into said sump and out of communication with said salt chamber, a passage for water from said sump into said reservoir, and valve means for automatically controlling the ingress of fresh water to said salt chamber as the water in said reservoir rises to or falls below a predetermined level.

WILLIAM T. RUNCIE.